United States Patent
Ozluturk et al.

(10) Patent No.: US 7,117,004 B2
(45) Date of Patent: *Oct. 3, 2006

(54) METHOD AND SUBSCRIBER UNIT FOR PERFORMING AN ACCESS PROCEDURE

(75) Inventors: Fatih M. Ozluturk, Port Washington, NY (US); Gary R. Lomp, Centerport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/866,851

(22) Filed: Jun. 14, 2004

(65) Prior Publication Data

US 2004/0242259 A1 Dec. 2, 2004

Related U.S. Application Data

(63) Continuation of application No. 10/400,343, filed on Mar. 26, 2003, now Pat. No. 6,839,567, which is a continuation of application No. 10/086,320, filed on Mar. 1, 2002, now Pat. No. 6,571,105, which is a continuation of application No. 09/721,034, filed on Nov. 22, 2000, now Pat. No. 6,493,563, which is a continuation of application No. 09/003,104, filed on Jan. 6, 1998, now Pat. No. 6,181,949, which is a continuation of application No. 08/670,162, filed on Jun. 27, 1996, now Pat. No. 5,841,768.

(51) Int. Cl.
*H04B 1/00* (2006.01)

(52) U.S. Cl. ............ 455/522; 455/69; 455/63.11; 370/335; 370/342; 370/278

(58) Field of Classification Search ........... 455/522, 455/63.11, 69, 517, 507; 370/335, 342, 394, 370/395.2, 395.21, 514, 278, 491
See application file for complete search history.

(56) References Cited

U.S. PATENT DOCUMENTS

| | | | |
|---|---|---|---|
| 4,811,421 A | 3/1989 | Havel et al. | |
| 5,022,049 A | 6/1991 | Abrahamson et al. | |
| 5,056,109 A | 10/1991 | Gilhousen et al. | |
| 5,113,525 A | 5/1992 | Andoh | |
| 5,159,283 A | 10/1992 | Jensen | |

(Continued)

FOREIGN PATENT DOCUMENTS

EP 0565507 10/1993

(Continued)

OTHER PUBLICATIONS

Rick et al., "Noncoherent Parallel Acquisition in CDMA Spread Spectrum Systems," IEEE International Conference on New Orleans LA, USA, May 1-5, 1994, New York, NY, USA, IEEE, pp. 1422-1426.

(Continued)

*Primary Examiner*—Lana Le
(74) *Attorney, Agent, or Firm*—Volpe and Koenig, P.C.

(57) ABSTRACT

A base station for controlling transmission power during the establishment of a communication channel utilizes the reception of a short code during initial power ramp-up. The short code is a sequence for detection by the base station which has a much shorter period than a conventional access code. The ramp-up starts from a power level that is lower than the required power level for detection by the base station. The power of the short code is quickly increased until the signal is detected by the base station. Once the base station detects the short code, it transmits an indication that the short code has been detected.

66 Claims, 11 Drawing Sheets

U.S. PATENT DOCUMENTS

| | | | |
|---|---|---|---|
| 5,235,614 A | | 8/1993 | Bruckert et al. |
| 5,257,283 A | | 10/1993 | Gilhousen et al. |
| 5,265,119 A | | 11/1993 | Gilhousen et al. |
| 5,267,262 A | * | 11/1993 | Wheatley, III ............... 455/522 |
| 5,297,162 A | | 3/1994 | Lee et al. |
| 5,309,474 A | | 5/1994 | Gilhousen et al. |
| 5,327,455 A | | 7/1994 | De Gaudenzi et al. |
| 5,347,536 A | | 9/1994 | Mechan |
| 5,353,302 A | | 10/1994 | Bi |
| 5,353,352 A | | 10/1994 | Dent et al. |
| 5,373,502 A | | 12/1994 | Turban |
| 5,377,183 A | | 12/1994 | Dent |
| 5,414,728 A | | 5/1995 | Zehavi |
| 5,430,760 A | * | 7/1995 | Dent ......................... 455/63.1 |
| 5,442,625 A | | 8/1995 | Gitlin et al. |
| 5,442,662 A | | 8/1995 | Fukasawa et al. |
| 5,446,756 A | | 8/1995 | Mallinckrodt |
| 5,490,165 A | * | 2/1996 | Blakeney et al. ........... 370/335 |
| 5,528,593 A | * | 6/1996 | English et al. .............. 455/403 |
| 5,528,623 A | | 6/1996 | Foster, Jr. |
| 5,841,768 A | * | 11/1998 | Ozluturk et al. ............ 370/335 |
| 5,940,382 A | | 8/1999 | Haim |
| 6,181,949 B1 | * | 1/2001 | Ozluturk et al. ............ 455/522 |
| 6,263,010 B1 | * | 7/2001 | Naruse et al. ............... 370/335 |
| 6,490,462 B1 | * | 12/2002 | Ozluturk et al. ............... 455/69 |
| 6,493,563 B1 | * | 12/2002 | Ozluturk et al. ............ 455/522 |
| 6,507,745 B1 | * | 1/2003 | Ozluturk et al. ............ 455/522 |
| 6,571,105 B1 | * | 5/2003 | Ozluturk et al. ............ 455/522 |
| 6,577,876 B1 | * | 6/2003 | Ozluturk et al. ............ 455/522 |
| 6,606,503 B1 | * | 8/2003 | Ozluturk et al. ............ 455/522 |
| 6,839,567 B1 | * | 1/2005 | Ozluturk et al. ............ 455/522 |
| 2003/0069007 A1 | * | 4/2003 | Rajaram et al. ............. 455/419 |
| 2005/0249165 A1 | * | 11/2005 | Ozluturk et al. ............ 370/335 |
| 2005/0249166 A1 | * | 11/2005 | Ozluturk et al. ............ 370/342 |
| 2005/0254478 A1 | * | 11/2005 | Ozluturk et al. ............ 370/278 |

FOREIGN PATENT DOCUMENTS

| | | |
|---|---|---|
| JP | 02256331 | 10/1990 |
| WO | 9702665 | 1/1997 |

OTHER PUBLICATIONS

TIA/EIA/IS-95-A, "Mobile Station-Base Station Compatibility Standard for Dual-Mode Wideband Spread Spectrum Cellular System", TIA/EIA Interim Standard, Telecommunications Industry Association, May 1995.

Ejzak et al., "Wideband Spread Spectrum Digital Technologies Standards", Telecommunications Industry Association Subcommittee TR-45.5, May 5, 1997.

Azad et al., "Multirate Spread Spectrum Direct Sequence CDMA Techniques", The Institution of Electrical Engineers, 1994, pp. 4/1-4/5.

I et al., "Performance of Multi-Code CDMA Wireless Personal Communications Networks", IEEE, 1995, pp. 907-911.

Krzymien et al., "Rapid Acquisition Algorithms for Synchronization of Bursty Transmissions in CDMA Microcellular and Personal Wireless Systems", IEEE Journal on Selected Areas in Communications, vol. 14, No. 3, Apr. 1996, pp. 570-579.

Ejzak et al., "Wideband Spread Spectrum Digital Technologies Standards", Telecommunications Industry Association, Subcommittee TR-45.5, Apr. 14, 1997.

"Summary of Multi-Channel Signaling Protocol", Phase 1C Service Definition, Lucent Technologies Presentation, Apr. 6, 1997, pp. 1-19.

"Summary of Multi-Channel Signaling Protocol", Phase 1C Service Definition, Lucent Technologies Presentation, Apr. 6, 1997, pp. 1-21.

Knisely, "Lucent Technologies Air Interface Proposal for CDMA High Speed Data Service", Telecommunications Industry Association Subcommittee TR-45.5—Wideband Spread Spectrum Digital Technologies Standards, Working Group III—Physical Layer, Feb. 24, 1997.

Kumar et al., "An Access Scheme for High Speed Packet Data Service on IS-95 Based CDMA", Bell Labs Lucent Technologies, Feb. 11, 1997.

Lucent Presentation, Lucent Technologies, Feb. 21, 1997, pp. 1-24.

"Packet Data Service Option Standard for Wideband Spread Spectrum Systems", TIA/EIA Interim Standard, TIA/EIA/IS-657, Jul. 1996.

I et al., "Multi-Code CDMA Wireless Personal Communications Networks", IEEE, 1995, pp. 1060-1064.

I et al., "Variable Spreading Gain CDMA with Adaptive Control for True Packet Switching Wireless Network", IEEE, 1995, pp. 725-730.

"Data Service Options for Wideband Spread Spectrum Systems: Introduction", TR 45, Mar. 20, 1997 (Content Revision 1).

I et al, "Load and Interference Based Demand Assignment (LIDA), for Integrated Services in CDMA Wireless Systems", IEEE, 1996, pp. 235-241.

Yang, Network Wireless Systems Offer Business Unit (NWS OBU) Feature Definition Document for Code Division Multiple Access (CDMA) Packet Mode Data Services, CDMA Packet Mode Data Services, FDD-1444, Nov. 26, 1996.

Budka et al, "Cellular Digital Packet Data Networks", Bell Labs Technical Journal, Summer 1997, pp. 164-181.

Liu et al., "Channel Access and Interference Issues in Multi-Code DS-CDMA Wireless Packet (ATM) Networks".

* cited by examiner

METHOD AND SUBSCRIBER UNIT FOR PERFORMING AN ACCESS PROCEDURE

CROSS REFERENCE TO RELATED APPLICATION

This application is a continuation of application Ser. No. 10/400,343, filed Mar. 26, 2003 now U.S. Pat. No. 6,839,567 which is a continuation of Ser. No. 10/086,320, filed Mar. 1, 2002, which issued on May 27, 2003 as U.S. Pat. No. 6,571,105; which is a continuation of application Ser. No. 09/721,034, filed Nov. 22, 2000, which issued on Dec. 10, 2002 as U.S. Pat. No. 6,493,563; which is a continuation of application Ser. No. 09/003,104, filed Jan. 6, 1998, which issued on Jan. 30, 2001 as U.S. Pat. No. 6,181,949; which is a continuation of application Ser. No. 08/670,162, filed on Jun. 27, 1996, which issued on Nov. 24, 1998 as U.S. Pat. No. 5,841,768; which applications and patents are incorporated herein by reference.

BACKGROUND OF THE INVENTION

1. Field of the Invention

The present invention relates generally to CDMA communication systems. More specifically, the present invention relates to a CDMA communication system which utilizes the transmission of short codes from subscriber units to a base station to reduce the time required for the base station to detect the signal from a subscriber unit. The improved detection time allows a faster ramp-up of the initial transmit power from the subscriber units while reducing the unnecessary power overshoot.

2. Description of Related Art

The use of wireless telecommunication systems has grown dramatically in the last decade as the reliability and capacity of the systems have improved. Wireless communication systems are being utilized in a variety of applications where land line based systems are impractical or impossible to use. Applications of wireless communications include cellular phone communications, communications in remote locations, and temporary communications for disaster recovery. Wireless communication systems have also become an economically viable alternative to replacing aging telephone lines and outdated telephone equipment.

The portion of the RF spectrum available for use by wireless communication systems is a critical resource. The RF spectrum must be shared among all commercial, governmental and military applications. There is a constant desire to improve the efficiency of wireless communication systems in order to increase system capacity.

Code division multiple access (CDMA) wireless communication systems have shown particular promise in this area. Although more traditional time division multiple access (TDMA) and frequency division multiple access (FDMA) systems have improved using the latest technological advances, CDMA systems, in particular Broadband Code Division Multiple Access™ (B-CDMA™) systems, have significant advantages over TDMA and FDMA systems. This efficiency is due to the improved coding and modulation density, interference rejection and multipath tolerance of B-CDMA™ systems, as well as reuse of the same spectrum in every communication cell. The format of CDMA communication signals also makes it extremely difficult to intercept calls, thereby ensuring greater privacy for callers and providing greater immunity against fraud.

In a CDMA system, the same portion of the frequency spectrum is used for communication by all subscriber units. Each subscriber unit's baseband data signal is multiplied by a code sequence, called the "spreading code", which has a much higher rate than the data. The ratio of the spreading code rate to the data symbol rate is called the "spreading factor" or the "processing gain". This coding results in a much wider transmission spectrum than the spectrum of the baseband data signal, hence the technique is called "spread spectrum". Subscriber units and their communications can be discriminated by assigning a unique spreading code to each communication link which is called a CDMA channel. Since all communications are sent over the same frequency band, each CDMA communication overlaps communications from other subscriber units and noise-related signals in both frequency and time.

The use of the same frequency spectrum by a plurality of subscriber units increases the efficiency of the system. However, it also causes a gradual degradation of the performance of the system as the number of users increase. Each subscriber unit detects communication signals with its unique spreading code as valid signals and all other signals are viewed as noise. The stronger the signal from a subscriber unit arrives at the base station, the more interference the base station experiences when receiving and demodulating signals from other subscriber units. Ultimately, the power from one subscriber unit may be great enough to terminate communications of other subscriber units. Accordingly, it is extremely important in wireless CDMA communication systems to control the transmission power of all subscriber units. This is best accomplished by using a closed loop power control algorithm once a communication link is established. A detailed explanation of such a closed loop algorithm is disclosed in U.S. patent application entitled Code Division Multiple Access (CDMA) System and Method filed concurrently herewith, which is incorporated by reference as if fully set forth.

The control of transmission power is particularly critical when a subscriber unit is attempting to initiate communications with a base station and a power control loop has not yet been established. Typically, the transmission power required from a subscriber unit changes continuously as a function of the propagation loss, interference from other subscribers, channel noise, fading and other channel characteristics. Therefore, a subscriber unit does not know the power level at which it should start transmitting. If the subscriber unit begins transmitting at a power level that is too high, it may interfere with the communications of other subscriber units and may even terminate the communications of other subscriber units. If the initial transmission power level is too low, the subscriber unit will not be detected by the base station and a communication link will not be established.

There are many methods for controlling transmission power in a CDMA communication system. For example, U.S. Pat. No. 5,056,109 (Gilhousen et al.) discloses a transmission power control system wherein the transmission power of the subscriber unit is based upon periodic signal measurements from both the subscriber unit and the base station. The base station transmits a pilot signal to all subscriber units which analyze the received pilot signal, estimate the power loss in the transmitted signal and adjust their transmission power accordingly. Each subscriber unit includes a non-linear loss output filter which prevents sudden increases in power which would cause interference to other subscriber units. This method is too complex to permit a base station to quickly acquire a subscriber unit while limiting the interference to other subscriber units. In addition, the propagation losses, interference and noise levels experienced in a forward link (transmission from the base station to a subscriber unit) is often not the same as in a reverse link (transmission from a subscriber unit to the base station). Reverse link power estimates based on forward link losses are not precise.

Many other types of prior art transmission power control systems require complex control signaling between communicating units or preselected transmission values to control transmission power. These power control techniques are inflexible and often impractical to implement.

Accordingly, there is a need for an efficient method of controlling the initial ramp-up of transmission power by subscriber units in a wireless CDMA communication system.

SUMMARY OF THE INVENTION

The present invention comprises a novel method of controlling transmission power during the establishment of a channel in a CDMA communication system by utilizing the transmission of a short code from a subscriber unit to a base station during initial power ramp-up. The short code is a sequence for detection by the base station which has a much shorter period than a conventional spreading code. The ramp-up starts from a power level that is guaranteed to be lower than the required power level for detection by the base station. The subscriber unit quickly increases transmission power while repeatedly transmitting the short code until the signal is detected by the base station. Once the base station detects the short code, it sends an indication to the subscriber unit to cease increasing transmission power. The use of short codes limits power overshoot and interference to other subscriber stations and permits the base station to quickly synchronize to the spreading code used by the subscriber unit.

Accordingly, it is an object of the present invention to provide an improved technique for controlling power ramp-up during establishment of a communication channel between a CDMA subscriber unit and base station.

Other objects and advantages of the present invention will become apparent after reading the description of a presently preferred embodiment.

DETAILED DESCRIPTION OF THE PREFERRED EMBODIMENT

Figure 1:
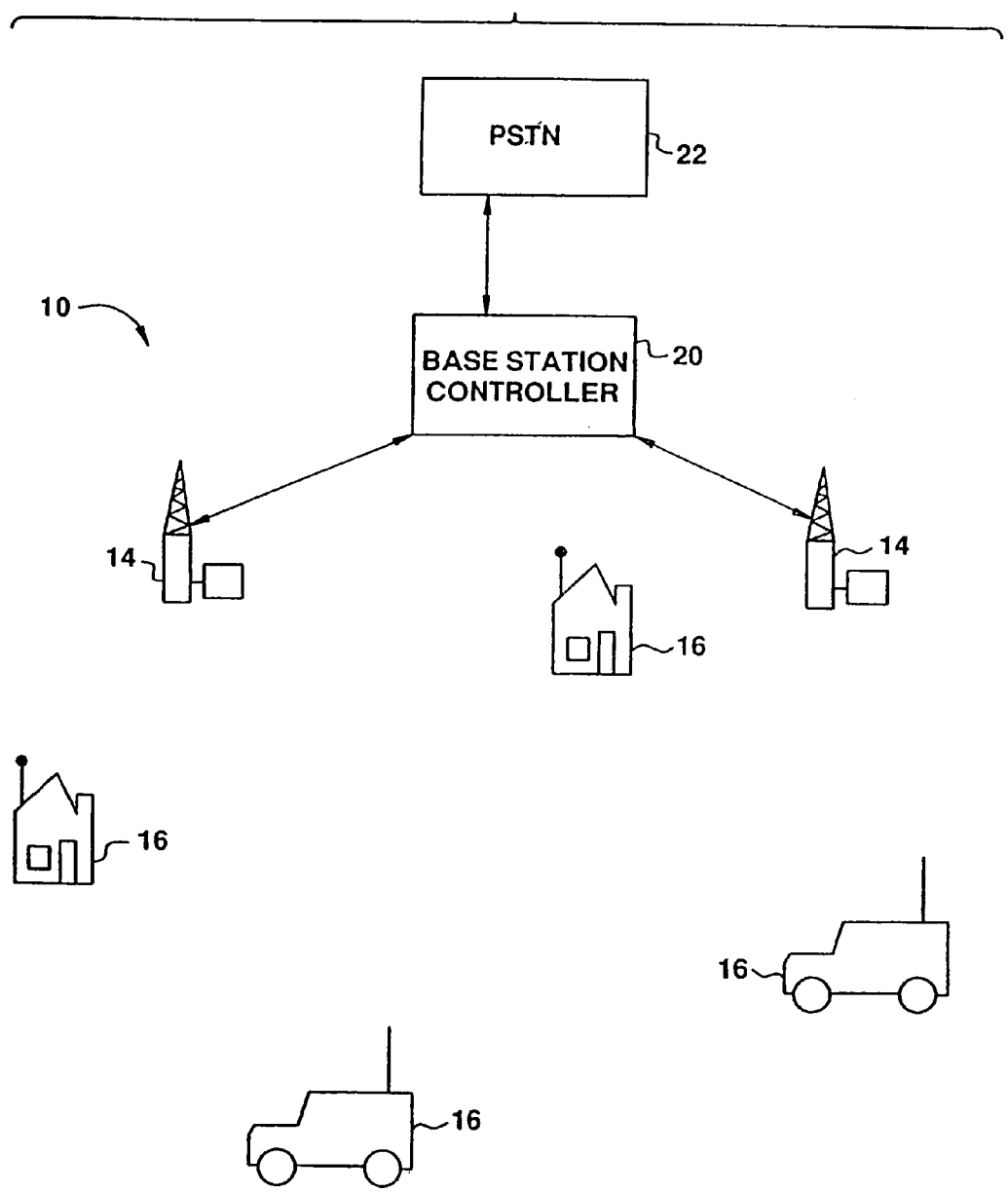
FIG. 1 is a schematic overview of a code division multiple access communication system in accordance with the present invention.

The preferred embodiment will be described with reference to the drawing figures where identical numerals represent similar elements throughout.

A communication network 10 embodying the present invention is shown in FIG. 1. The communication network 10 generally comprises one or more base stations 14, each of which is in wireless communication with a plurality of subscriber units 16, which may be fixed or mobile. Each subscriber unit 16 communicates with either the closest base station 14 or the base station 14 which provides the strongest communication signal. The base stations 14 also communicate with a base station controller 20, which coordinates communications among base stations 14. The communication network 10 may also be connected to a public switched telephone network (PSTN) 22, wherein the base station controller 20 also coordinates communications between the base stations 14 and the PSTN 22. Preferably, each base station 14 communicates with the base station controller 20 over a wireless link, although a land line may also be provided. A land line is particularly applicable when a base station 14 is in close proximity to the base station controller 20.

The base station controller 20 performs several functions. Primarily, the base station controller 20 provides all of the operations, administrative and maintenance (OA&M) signaling associated with establishing and maintaining all of the wireless communications between the subscriber units 16, the base stations 14, and the base station controller 20. The base station controller 20 also provides an interface between the wireless communication system 10 and the PSTN 22. This interface includes multiplexing and demultiplexing of the communication signals that enter and leave the system 10 via the base station controller 20. Although the wireless communication system 10 is shown employing antennas to transmit RF signals, one skilled in the art should recognize that communications may be accomplished via microwave or satellite uplinks. Additionally, the functions of the base station controller 20 may be combined with a base station 14 to form a "master base station".

Figure 2:
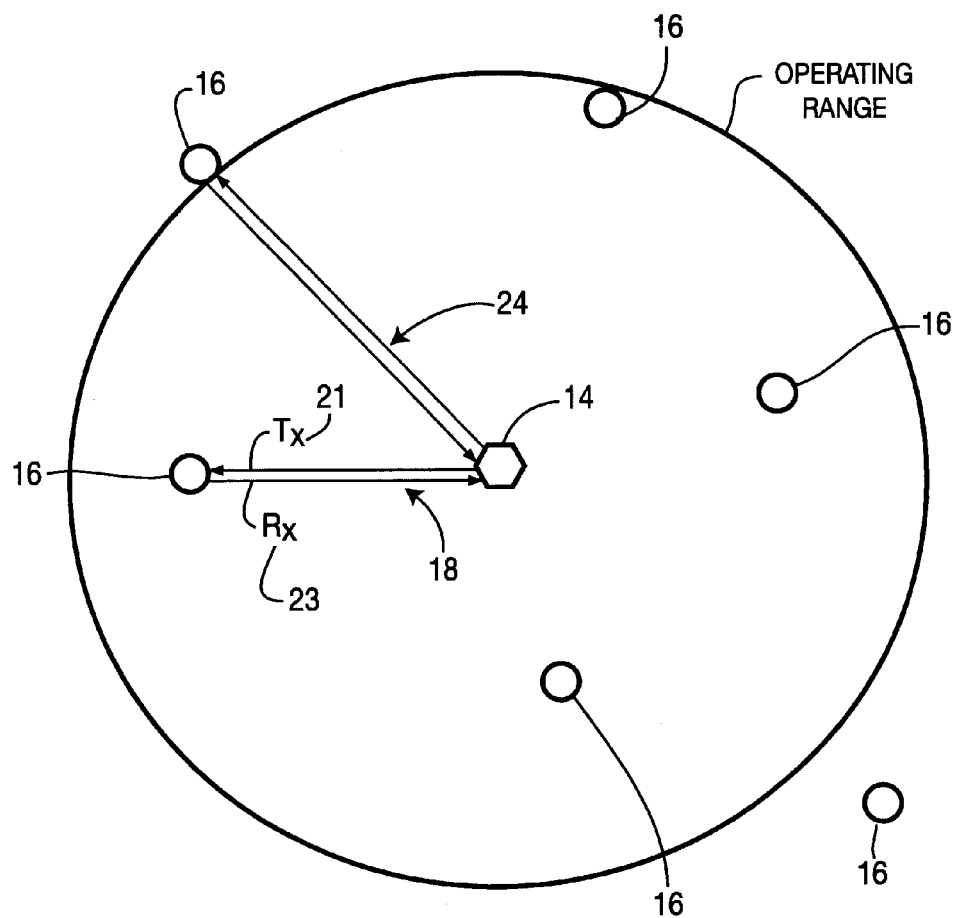
FIG. 2 is a diagram showing the operating range of a base station.

Referring to FIG. 2, the propagation of signals between a base station 14 and a plurality of subscriber units 16 is shown. A two-way communication channel (link) 18 comprises a signal transmitted 21 (Tx) from the base station 14 to the subscriber unit 16 and a signal received 23 (Rx) by the base station 14 from the subscriber unit 16. The Tx signal 21 is transmitted from the base station 14 and is received by the subscriber unit 16 after a propagation delay Δt. Similarly, the Rx signal originates at the subscriber unit 16 and terminates at the base station 14 after a further propagation delay Δt. Accordingly, the round trip propagation delay is 2Δt. In the preferred embodiment, the base station 14 has an operating range of approximately 30 kilometers. The round trip propagation delay 24 associated with a subscriber unit 16 at the maximum operating range is 200 microseconds.

It should be apparent to those of skill in the art that the establishment of a communication channel between a base station and a subscriber unit is a complex procedure involving many tasks performed by the base station and the subscriber unit which are outside the scope of the present invention. The present invention is directed to initial power ramp-up and synchronization during the establishment of a communication channel.

Figure 3:
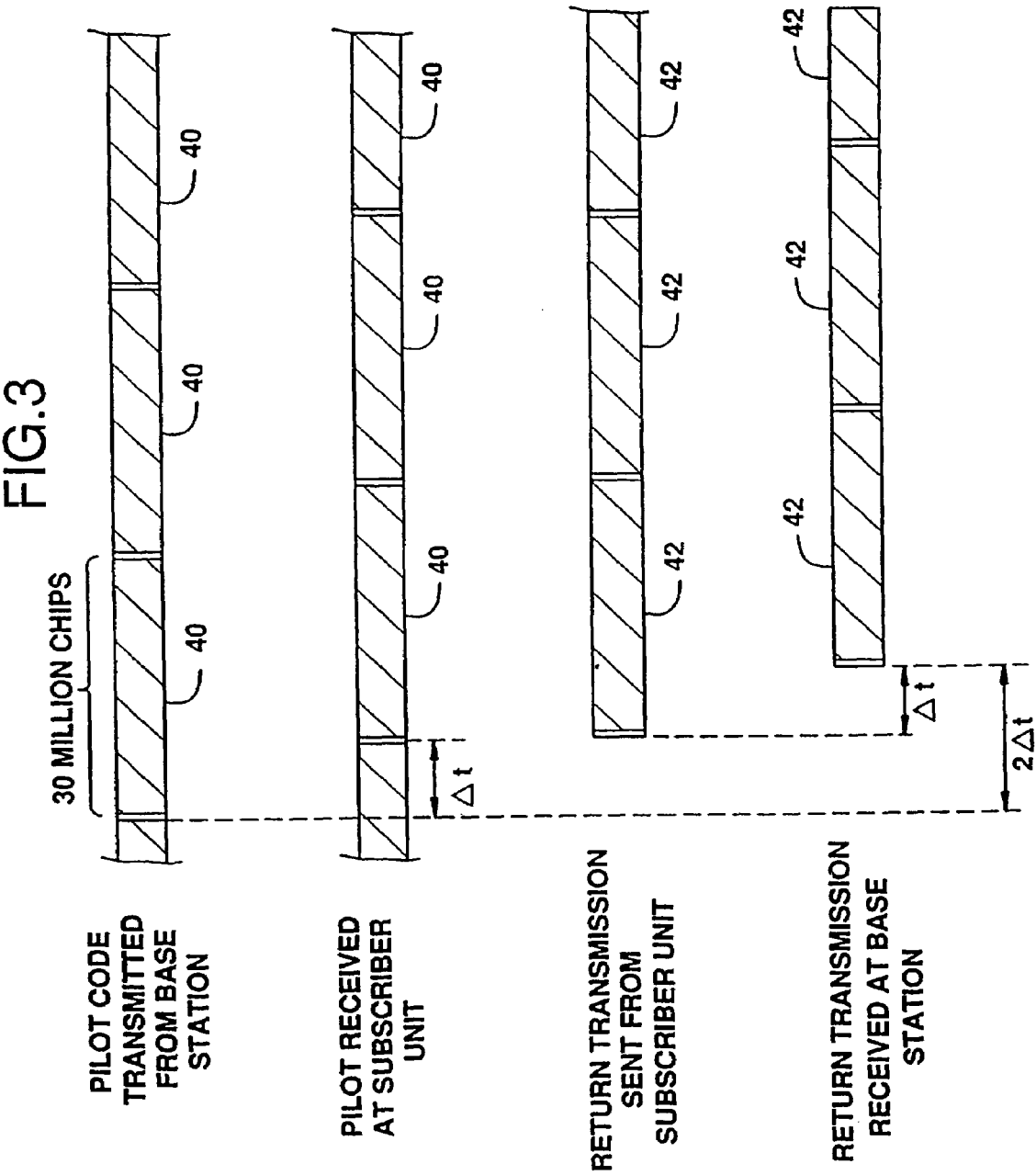
FIG. 3 is a timing diagram of communication signals between a base station and a subscriber unit.

Referring to FIG. 3, the signaling between a base station 14 and a subscriber unit 16 is shown. In accordance with the present invention, the base station 14 continuously transmits a pilot code 40 to all of the subscriber units 16 located within the transmitting range of the base station 14. The pilot code 40 is a spreading code which carries no data bits. The pilot code 40 is used for subscriber unit 16 acquisition and synchronization, as well as for determining the parameters of the adaptive matched filter used in the receiver.

The subscriber unit 16 must acquire the pilot code 40 transmitted by the base station 14 before it can receive or transmit any data. Acquisition is the process whereby the subscriber unit 16 aligns its locally generated spreading code with the received pilot code 40. The subscriber unit 16 searches through all of the possible phases of the received pilot code 40 until it detects the correct phase, (the beginning of the pilot code 40).

The subscriber unit 16 then synchronizes its transmit spreading code to the received pilot code 40 by aligning the beginning of its transmit spreading code to the beginning of the pilot code 40. One implication of this receive and transmit synchronization is that the subscriber unit 16 introduces no additional delay as far as the phase of the spreading codes are concerned. Accordingly, as shown in FIG. 3, the relative delay between the pilot code 40 transmitted from the base station 14 and the subscriber unit's transmit spreading code 42 received at the base station 14 is $2\Delta t$, which is solely due to the round trip propagation delay.

In the preferred embodiment, the pilot code is 29,877,120 chips in length and takes approximately 2 to 5 seconds to transmit, depending on the spreading factor. The length of the pilot code 40 was chosen to be a multiple of the data symbol no matter what kind of data rate or bandwidth is used. As is well known by those of skill in the art, a longer pilot code 40 has better randomness properties and the frequency response of the pilot code 40 is more uniform. Additionally, a longer pilot code 40 provides low channel cross correlation, thus increasing the capacity of the system 10 to support more subscriber units 16 with less interference. The use of a long pilot code 40 also supports a greater number of random short codes. For synchronization purposes, the pilot code 40 is chosen to have the same period as all of the other spreading codes used by the system 10. Thus, once a subscriber unit 16 acquires the pilot code 40, it is synchronized to all other signals transmitted from the base station 14.

During idle periods, when a call is not in progress or pending, the subscriber unit 16 remains synchronized to the base station 14 by periodically reacquiring the pilot code 40. This is necessary for the subscriber unit 16 to receive and demodulate any downlink transmissions, in particular paging messages which indicate incoming calls.

When a communication link is desired, the base station 14 must acquire the signal transmitted from the subscriber unit 16 before it can demodulate the data. The subscriber unit 16 must transmit an uplink signal for acquisition by the base station 14 to begin establishing the two-way communication link. A critical parameter in this procedure is the transmission power level of the subscriber unit 16. A transmission power level that is too high can impair communications in the whole service area, whereas a transmission power level that is too low can prevent the base station 14 from detecting the uplink signal.

In a first embodiment of the present invention the subscriber unit 16 starts transmitting at a power level guaranteed to be lower than what is required and increases transmission power output until the correct power level is achieved. This avoids sudden introduction of a strong interference, hence improving system 10 capacity.

Figure 4:
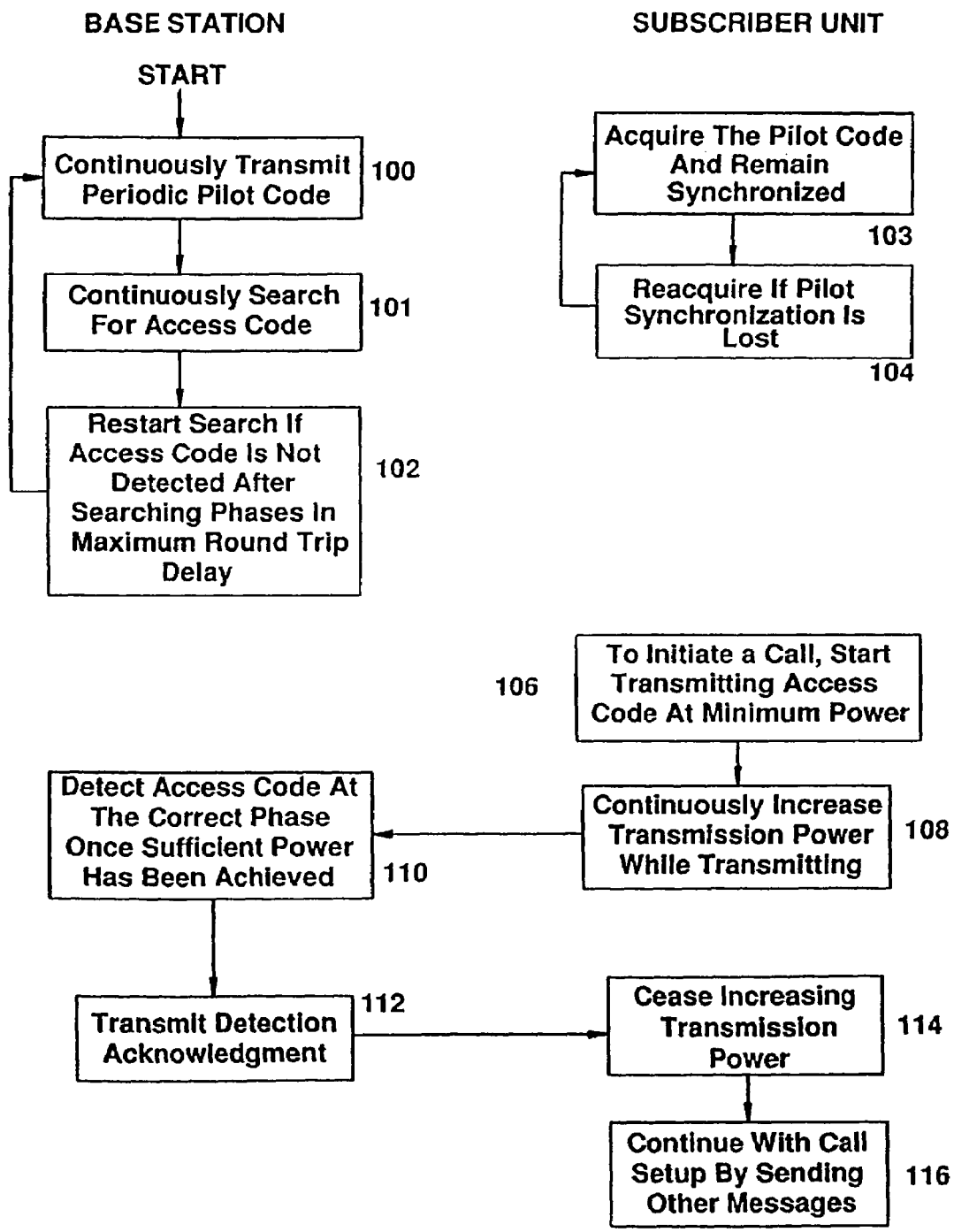
FIG. 4 is a flow diagram of the establishment of a communication channel between a base station and a subscriber unit.

The establishment of a communication channel in accordance with the present invention and the tasks performed by the base station 14 and a subscriber unit 16 are shown in FIG. 4. Although many subscriber units 16 may be located within the operating range of the base station 14, reference will be made hereinafter to a single subscriber unit 16 for simplicity in explaining the operation of the present invention.

The base station 14 begins by continuously transmitting a periodic pilot code 40 to all subscriber units 16 located within the operating range of the base station 14 (step 100). As the base station 14 transmits the pilot code 40 (step 100), the base station 14 searches (step 101) for an "access code" 42 transmitted by a subscriber unit 16. The access code 42 is a known spreading code transmitted from a subscriber unit 16 to the base station 14 during initiation of communications and power ramp-up. The base station 14 must search through all possible phases (time shifts) of the access code 42 transmitted from the subscriber unit 16 in order to find the correct phase. This is called the "acquisition" or the "detection" process (step 101). The longer the access code 42, the longer it takes for the base station 14 to search through the phases and acquire the correct phase.

As previously explained, the relative delay between signals transmitted from the base station 14 and return signals received at the base station 14 corresponds to the round trip propagation delay $2\Delta t$. The maximum delay occurs at the maximum operating range of the base station 14, known as the cell boundary. Accordingly, the base station 14 must search up to as many code phases as there are in the maximum round trip propagation delay, which is typically less code phases than there are in a code period.

For a data rate Rb and spreading code rate Rc, the ratio $L=Rc/Rb$ is called the spreading factor or the processing gain. In the preferred embodiment of the present invention, the cell boundary radius is 30 km, which corresponds to approximately between 1000 and 2500 code phases in the maximum round trip delay, depending on the processing gain.

If the base station 14 has not detected the access code after searching through the code phases corresponding to the maximum round trip delay the search is repeated starting from the phase of the pilot code 40 which corresponds to zero delay (step 102).

During idle periods, the pilot code 40 from the base station 14 is received at the subscriber unit 16 which periodically synchronizes its transmit spreading code generator thereto (step 103). If synchronization with the pilot code 40 is lost, the subscriber unit 16 reacquires the pilot code 40 and resynchronizes (step 104).

When it is desired to initiate a communication link, the subscriber unit 16 starts transmitting the access code 42 back to the base station 14 (step 106). The subscriber unit 16 continuously increases the transmission power while retransmitting the access code 42 (step 108) until it receives an acknowledgment from the base station 14. The base station 14 detects the access code 42 at the correct phase once the minimum power level for reception has been achieved (step 110). The base station 14 subsequently transmits an access code detection acknowledgment signal (step 112) to the subscriber unit 16. Upon receiving the acknowledgment, the subscriber unit ceases the transmission power increase (step 114). With the power ramp-up completed, closed loop power control and call setup signaling is performed (step 116) to establish the two-way communication link.

Although this embodiment limits subscriber unit 16 transmission power, acquisition of the subscriber unit 16 by the base station 14 in this manner may lead to unnecessary power overshoot from the subscriber unit 16, thereby reducing the performance of the system 10.

Figure 5:
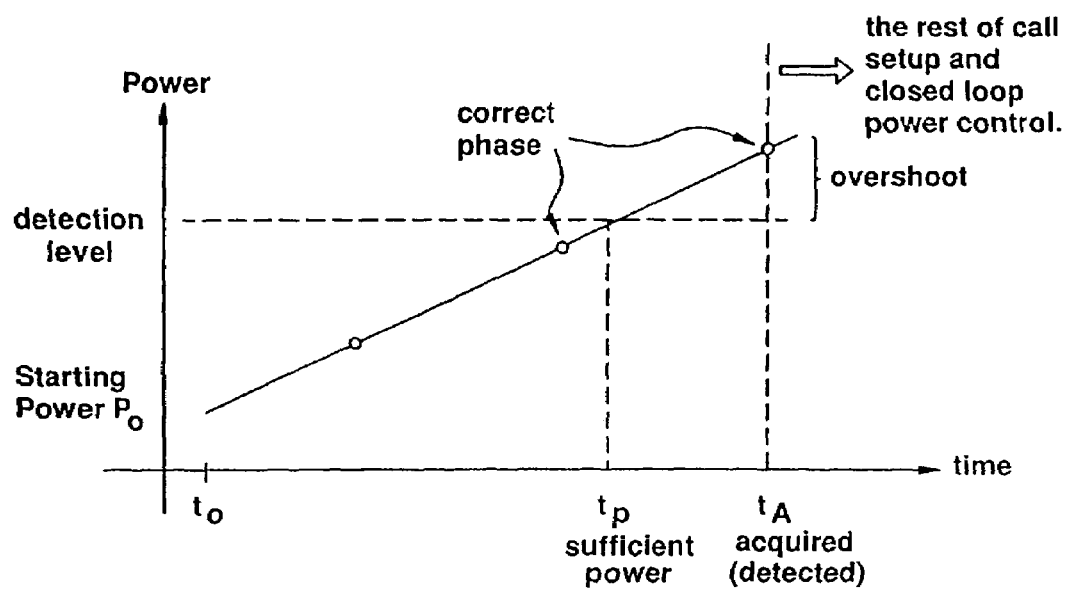
FIG. 5 is a graph of the transmission power output from a subscriber unit.

The transmission power output profile of the subscriber unit 16 is shown in FIG. 5. At $t_0$, the subscriber unit 16 starts transmitting at the starting transmission power level $P_0$, which is a power level guaranteed to be less than the power level required for detection by the base station 14. The subscriber unit 16 continually increases the transmission power level until it receives the detection indication from the base station 14. For the base station 14 to properly detect the access code 42 from the subscriber unit 16 the access code 42 must: 1) be received at a sufficient power level; and 2) be detected at the proper phase. Accordingly, referring to FIG. 5, although the access code 42 is at a sufficient power level for detection by the base station 14 at $t_P$, the base station 14 must continue searching for the correct phase of the access code 42 which occurs at $t_A$.

Since the subscriber unit 16 continues to increase the output transmission power level until it receives the detection indication from the base station 14, the transmission power of the access code 42 exceeds the power level required for detection by the base station 14. This causes unnecessary interference to all other subscriber units 16. If the power overshoot is too large, the interference to other subscriber units 16 may be so severe as to terminate ongoing communications of other subscriber units 16.

The rate that the subscriber unit 16 increases transmission power to avoid overshoot may be reduced, however, this results in a longer call setup time. Those of skill in the art would appreciate that adaptive ramp-up rates can also be used, yet these rates have shortcomings and will not appreciably eliminate power overshoot in all situations.

The preferred embodiment of the present invention utilizes "short codes" and a two-stage communication link establishment procedure to achieve fast power ramp-up without large power overshoots. The spreading code transmitted by the subscriber unit 16 is much shorter than the rest of the spreading codes (hence the term short code), so that the number of phases is limited and the base station 14 can quickly search through the code. The short code used for this purpose carries no data.

Figure 6A:
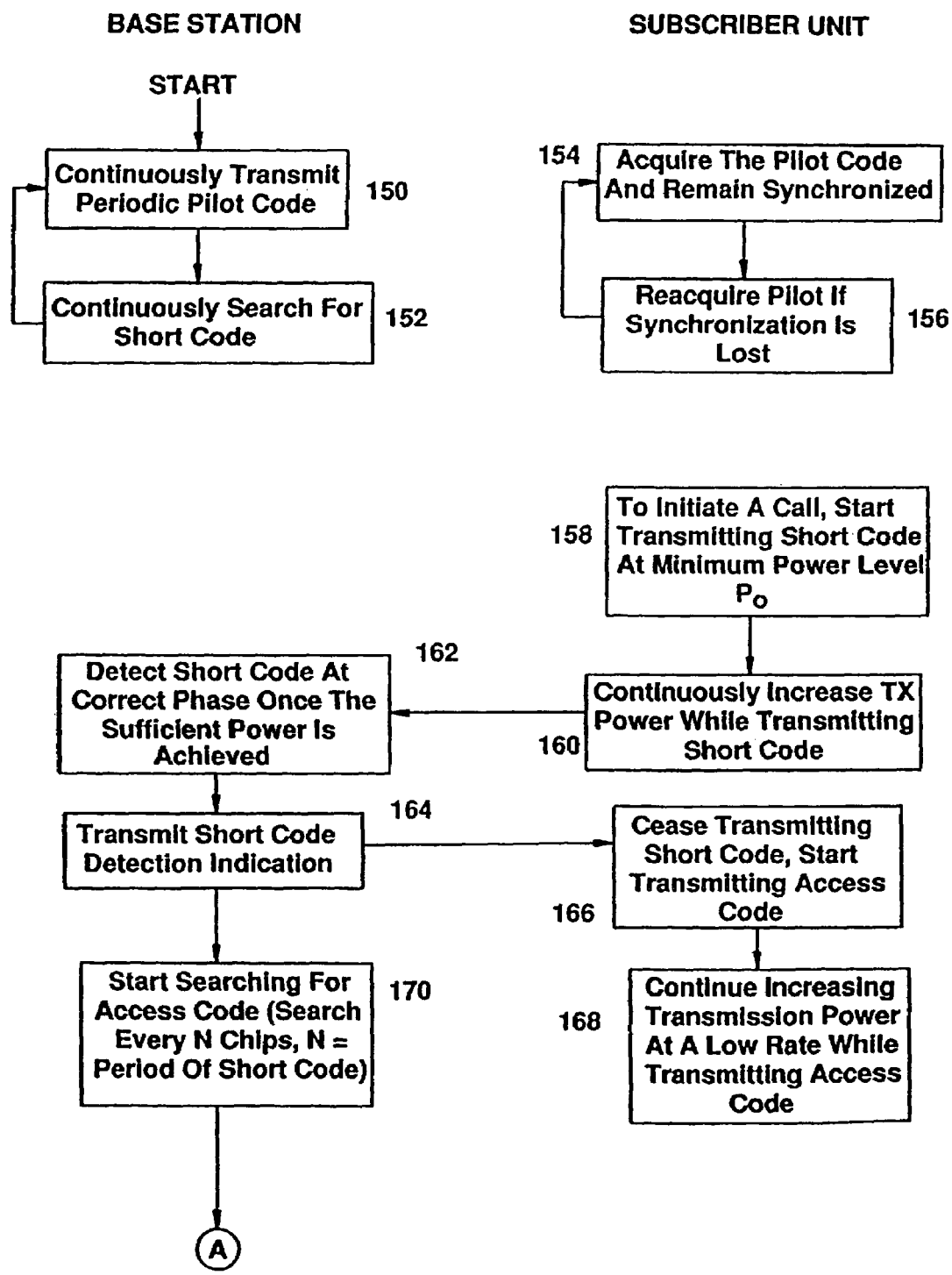
FIGS. 6A and 6B are flow diagrams of the establishment of a communication channel between a base station and a subscriber unit in accordance with the preferred embodiment of the present invention using short codes.
Figure 6B:
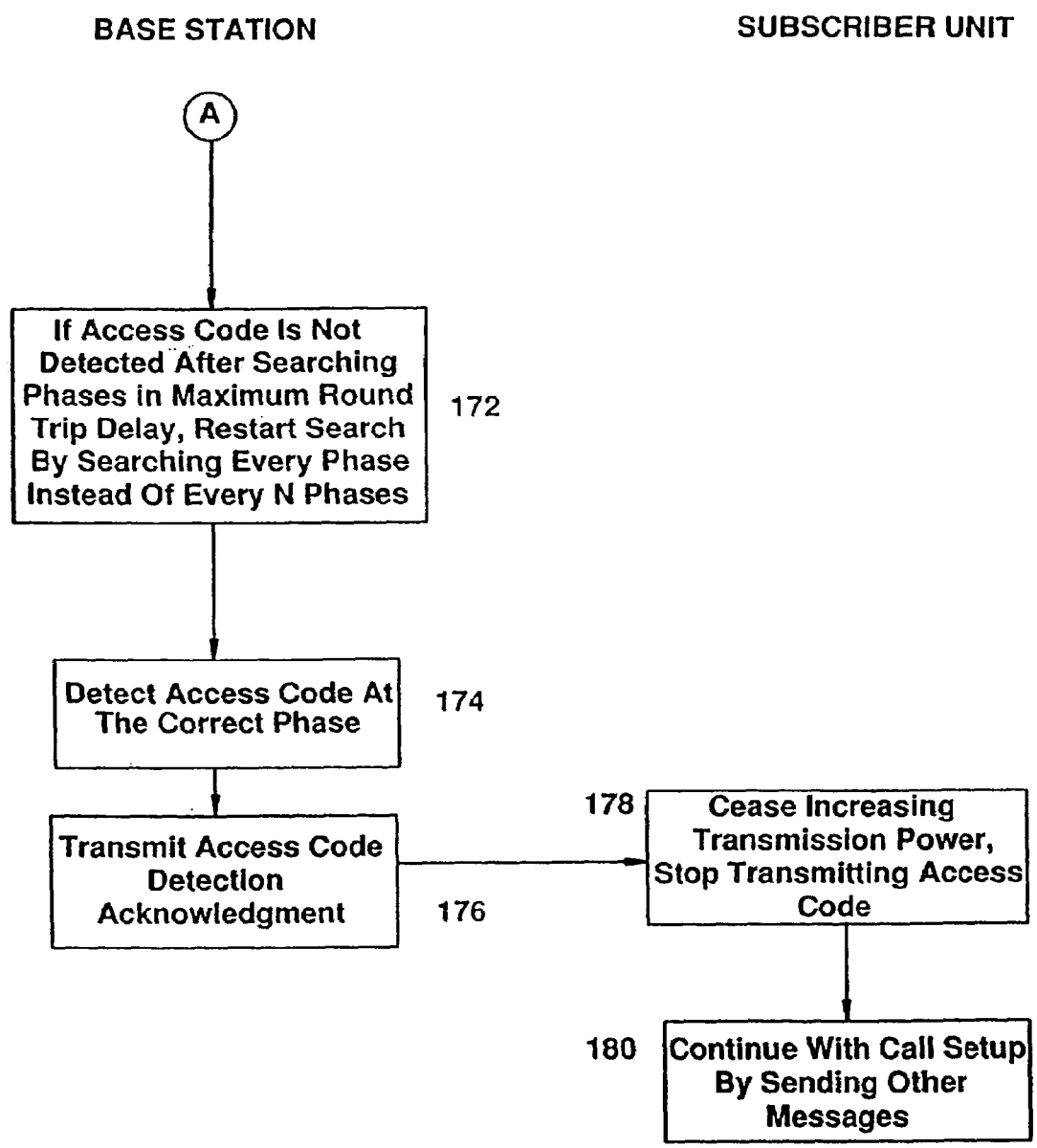

The tasks performed by the base station 14 and the subscriber unit 16 to establish a communication channel using short codes in accordance with the preferred embodiment of the present invention are shown in FIGS. 6A and 6B. During idle periods, the base station 14 periodically and continuously transmits the pilot code to all subscriber units 16 located within the operating range of the base station 14 (step 150). The base station 14 also continuously searches for a short code transmitted by the subscriber unit 16 (step 152). The subscriber unit 16 acquires the pilot code and synchronizes its transmit spreading code generator to the pilot code (step 154). The subscriber unit 16 also periodically checks to ensure it is synchronized. If synchronization is lost, the subscriber unit 16 reacquires the pilot signal transmitted by the base station 14 (step 156).

When a communication link is desired, the subscriber unit 16 starts transmitting a short code at the minimum power level $P_0$ (step 158) and continuously increases the transmission power level while retransmitting the short code (step 160) until it receives an acknowledgment from the base station 14 that the short code has been detected by the base station 14.

The access code in the preferred embodiment, as previously described herein, is approximately 30 million chips in length. However, the short code is much smaller. The short code can be chosen to be any length that is sufficiently short to permit quick detection. There is an advantage in choosing a short code length such that it divides the access code period evenly. For the access code described herein, the short code is preferably chosen to be 32, 64 or 128 chips in length. Alternatively, the short code may be as short as one symbol length, as will be described in detail hereinafter.

Since the start of the short code and the start of the access code are synchronized, once the base station 14 acquires the short code, the base station 14 knows that the corresponding phase of the access code is an integer multiple of N chips from the phase of the short code where N is the length of the short code. Accordingly, the base station 14 does not have to search all possible phases corresponding to the maximum round trip propagation delay.

Using the short code, the correct phase for detection by the base station 14 occurs much more frequently. When the minimum power level for reception has been achieved, the short code is quickly detected (step 162) and the transmission power overshoot is limited. The transmission power ramp-up rate may be significantly increased without concern for a large power overshoot. In the preferred embodiment of the present invention, the power ramp-up rate using the short code is 1 dB per millisecond.

The base station 14 subsequently transmits a short code detection indication signal (step 164) to the subscriber unit 16 which enters the second stage of the power ramp-up upon receiving this indication. In this stage, the subscriber unit 16 ceases transmitting the short code (step 166) and starts continuously transmitting a periodic access code (step 166). The subscriber unit 16 continues to ramp-up its transmission power while transmitting the access code, however the ramp-up rate is now much lower than the previous ramp-up rate used with the short code (step 168). The ramp-up rate with the access code is preferably 0.05 dB per millisecond. The slow ramp-up avoids losing synchronization with the base station 14 due to small changes in channel propagation characteristics.

At this point, the base station 14 has detected the short code at the proper phase and power level (step 162). The base station 14 must now synchronize to the access code which is the same length as all other spreading codes and much longer than the short code. Utilizing the short code, the base station 14 is able to detect the proper phase of the access code much more quickly. The base station 14 begins searching for the proper phase of the access code (step 170). However, since the start of the access code is synchronized with the start of the short code, the base station 14 is only required to search every N chips; where N=the length of the short code. In summary, the base station 14 quickly acquires the access code of the proper phase and power level by: 1) detecting the short code; and 2) determining the proper phase of the access code by searching every N chips of the access code from the beginning of the short code.

If the proper phase of the access code has not been detected after searching the number of phases in the maximum round trip delay the base station 14 restarts the search for the access code by searching every chip instead of every N chips (step 172). When the proper phase of the access code has been detected (step 174) the base station 14 transmits an access code detection acknowledgment (step 176) to the subscriber unit 16 which ceases the transmission power increase (step 178) upon receiving this acknowledgment. With the power ramp-up completed, closed loop power control and call setup signaling is performed (step 180) to establish the two-way communication link.

Figure 7:
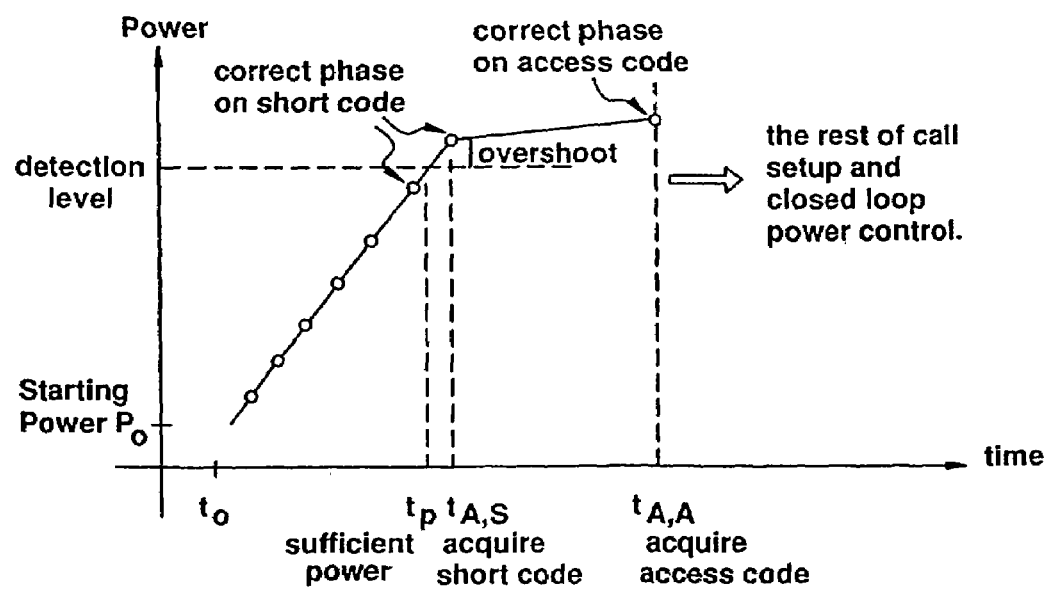
FIG. 7 is a graph of the transmission power output from a subscriber unit using short codes.

Referring to FIG. 7, although the starting power level $P_0$ is the same as in the prior embodiment, the subscriber unit 16 may ramp-up the transmission power level at a much higher rate by using a short code. The short code is quickly detected after the transmission power level surpasses the minimum detection level, thus minimizing the amount of transmission power overshoot.

Figure 8:
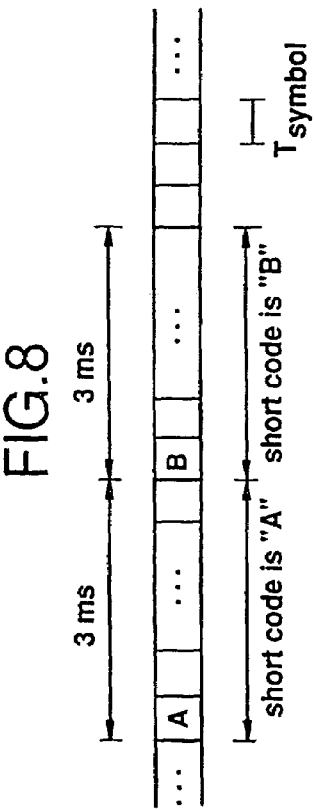
FIG. 8 shows the adaptive selection of short codes.

Although the same short code may be reused by the subscriber unit 16, in the preferred embodiment of the present invention the short codes are dynamically selected and updated in accordance with the following procedure. Referring to FIG. 8, the period of the short code is equal to one symbol length and the start of each period is aligned with a symbol boundary. The short codes are generated from a regular length spreading code. A symbol length portion from the beginning of the spreading code is stored and used as the short code for the next 3 milliseconds. Every 3 milliseconds, a new symbol length portion of the spreading code replaces the old short code. Since the spreading code period is an integer multiple of 3 milliseconds, the same short codes are repeated once every period of the spreading code.

Periodic updating of the short code averages the interference created by the short code over the entire spectrum. A detailed description of the selection and updating of the short codes is outside the scope of this invention. However, such a detailed description is disclosed in the related application U.S. patent application entitled Code Division Multiple Access (CDMA) System and Method.

Figure 9:
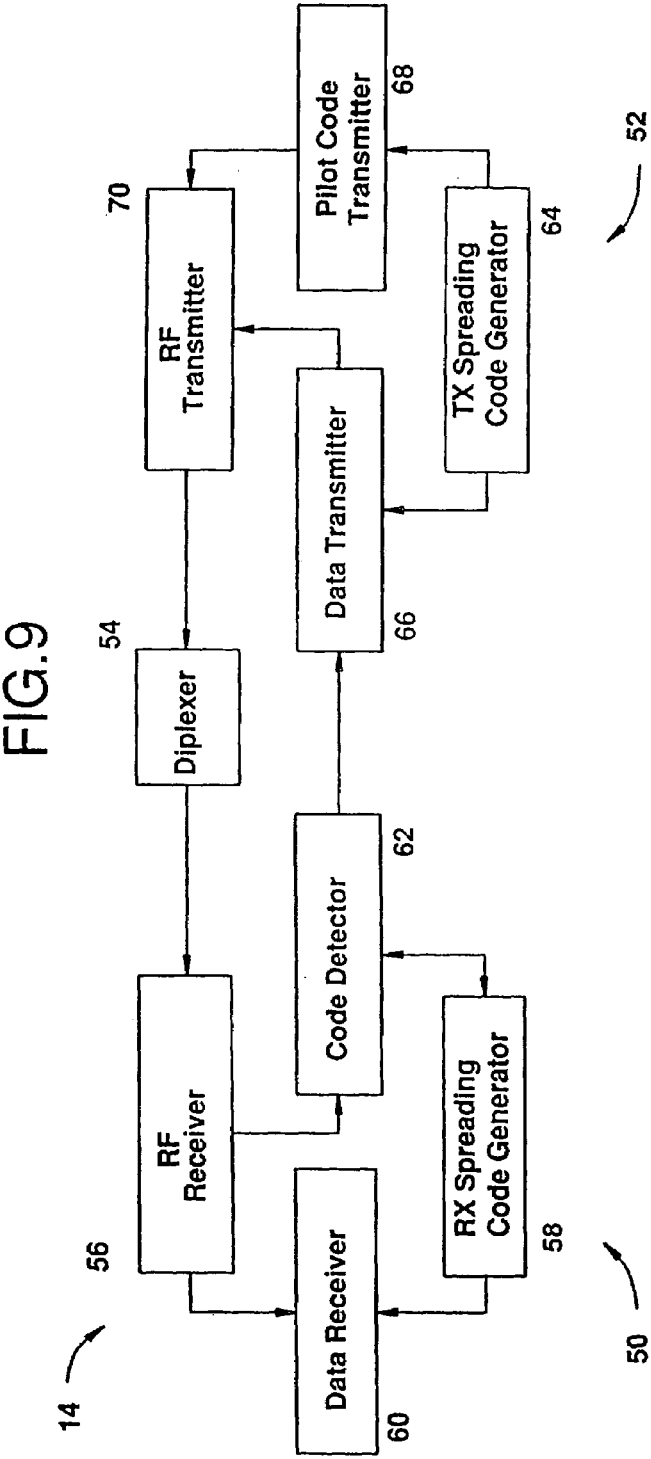
FIG. 9 is a block diagram of a base station in accordance with the present invention.

A block diagram of the base station 14 is shown in FIG. 9. Briefly described, the base station 14 comprises a receiver section 50, a transmitter section 52 and a diplexer 54. An RF receiver 56 receives and down-converts the RF signal received from the diplexer 54. The receive spreading code generator 58 outputs a spreading code to both the data receiver 60 and the code detector 62. In the data receiver 60, the spreading code is correlated with the baseband signal to extract the data signal which is forwarded for further processing. The received baseband signal is also forwarded to the code detector 62 which detects the access code or the short code from the subscriber unit 16 and adjusts the timing of the spreading code generator 58 to establish a communication channel 18.

In the transmitter section 52 of the base station 14, the transmit spreading code generator 64 outputs a spreading code to the data transmitter 66 and the pilot code transmitter 68. The pilot code transmitter 68 continuously transmits the periodic pilot code. The data transmitter 66 transmits the short code detect indication and access code detect acknowledgment after the code detector 62 has detected the short code or the access code respectively. The data transmitter also sends other message and data signals. The signals from the data transmitter 66 and the pilot code transmitter 68 are combined and up-converted by the RF transmitter 70 for transmission to the subscriber units 16.

Figure 10:
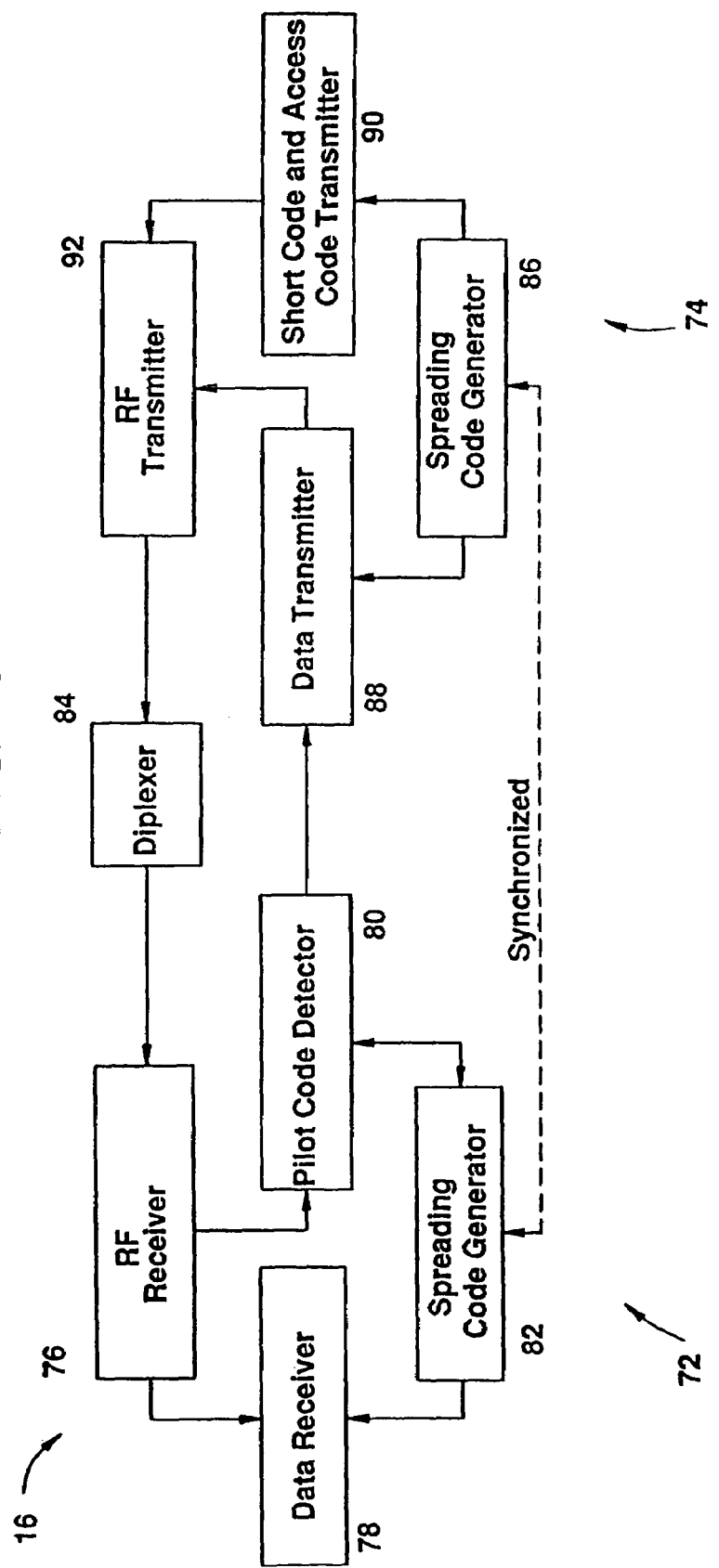
FIG. 10 is a block diagram of the subscriber unit in accordance with the present invention.

A block diagram of the subscriber unit 16 is shown in FIG. 10. Briefly described, the subscriber unit 16 comprises a receiver section 72, a transmitter section 74 and a diplexer 84. An RF receiver 76 receives and down-converts the RF signal received from the diplexer 84. A pilot code detector 80 correlates the spreading code with the baseband signal to acquire the pilot code transmitted by the base station 14. In this manner, the pilot code detector 80 maintains synchronization with the pilot code. The receiver spreading code generator 82 generates and outputs a spreading code to the data receiver 78 and the pilot code detector 80. The data receiver 78 correlates the spreading code with the baseband signal to process the short code detect indication and the access code detect acknowledgment transmitted by the base station 14.

The transmitter section 74 comprises a spreading code generator 86 which generates and outputs spreading codes to a data transmitter 88 and a short code and access code transmitter 90. The short code and access code transmitter 90 transmits these codes at different stages of the power ramp-up procedure as hereinbefore described. The signals output by the data transmitter 88 and the short code and access code transmitter 90 are combined and up-converted by the RF transmitter 92 for transmission to the base station 14. The timing of the receiver spreading code generator 82 is adjusted by the pilot code detector 80 through the acquisition process. The receiver and transmitter spreading code generators 82, 86 are also synchronized.

Figure 11A:
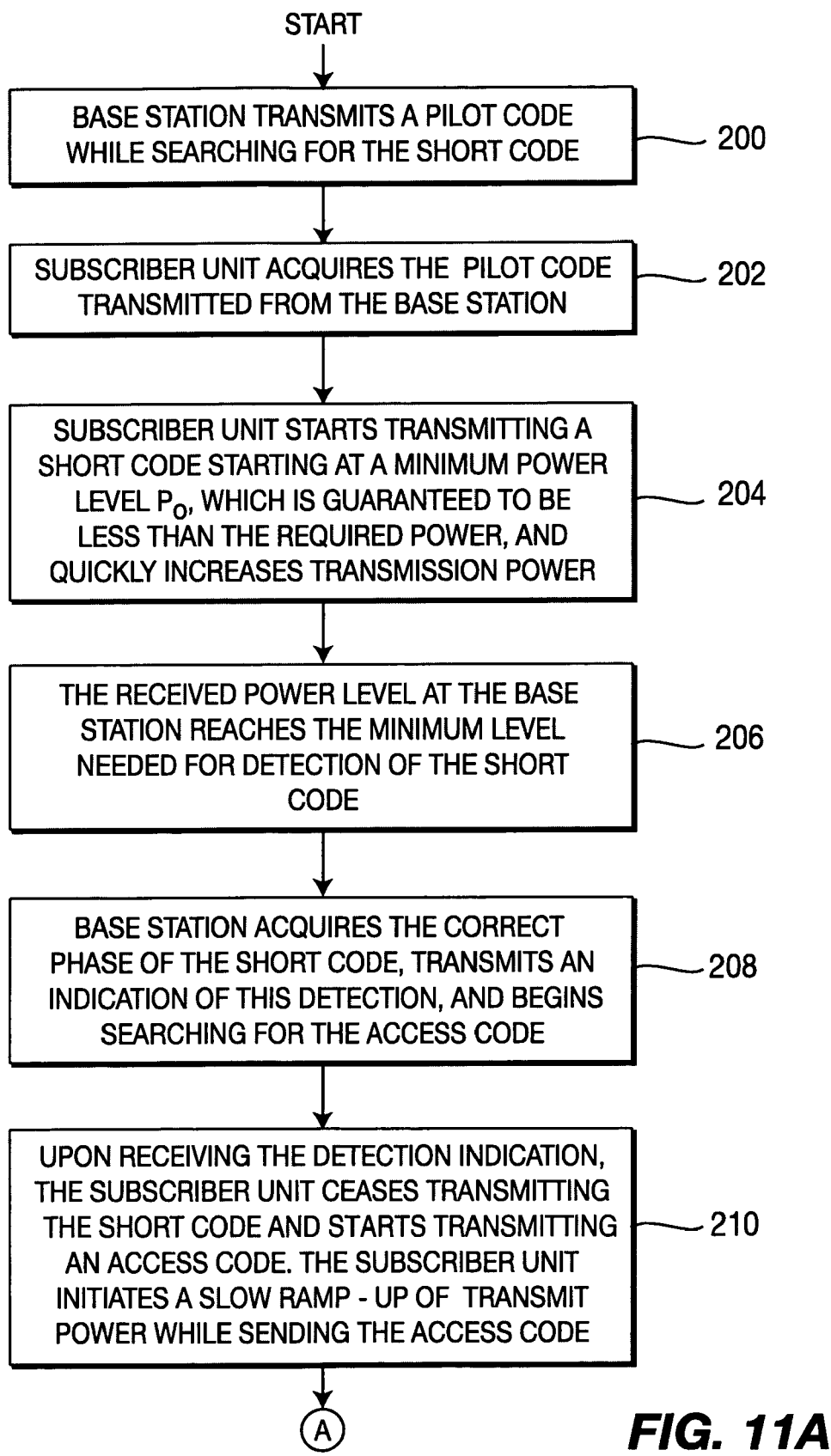
FIGS. 11A and 11B are flow diagrams of the ramp-up procedure implemented in accordance with the present invention.
Figure 11B:
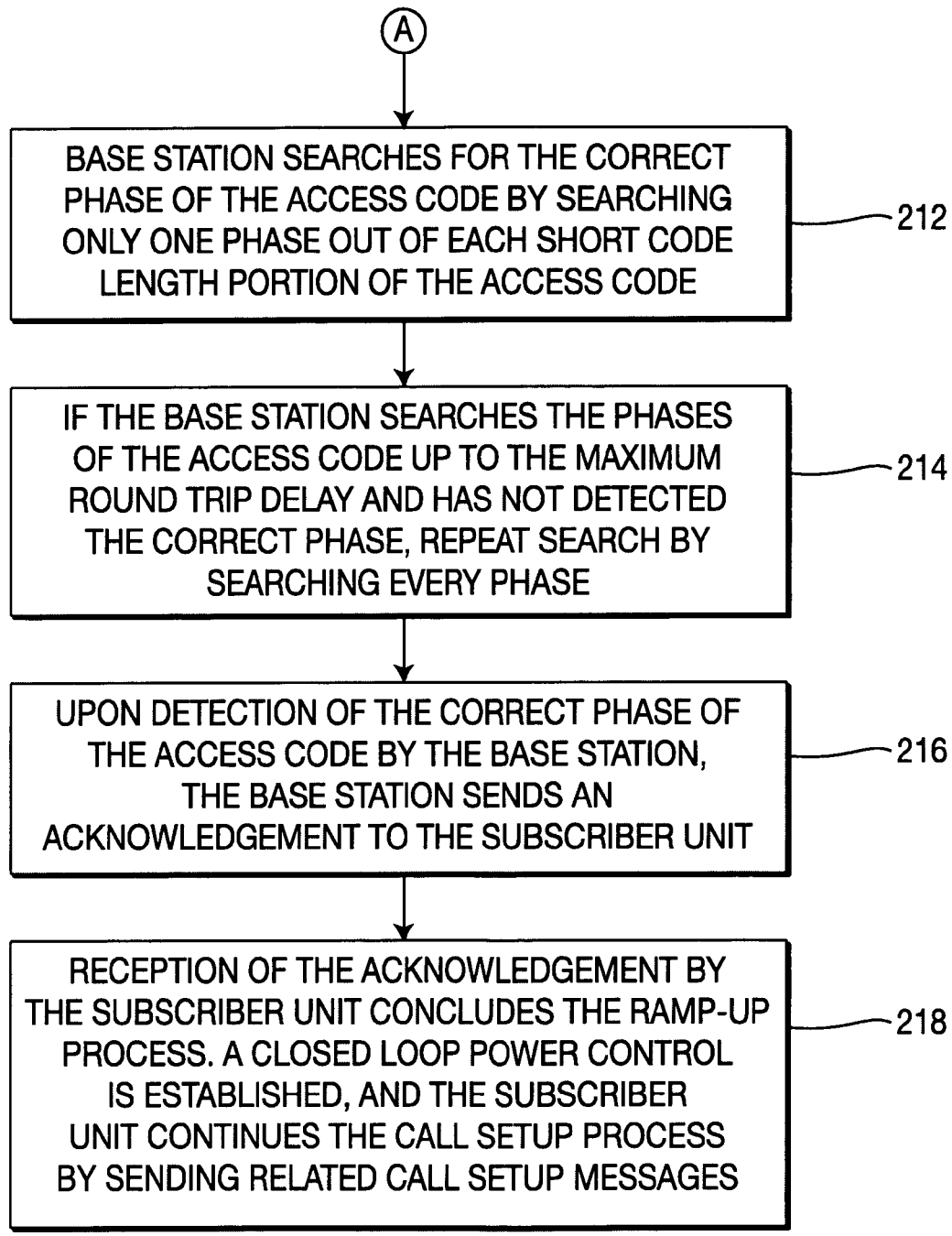

An overview of the ramp-up procedure in accordance with the preferred current invention is summarized in FIGS. 11A and 11B. The base station 14 transmits a pilot code while searching for the short code (step 200). The subscriber unit 16 acquires the pilot code transmitted from the base station 14 (step 202), starts transmitting a short code starting at a minimum power level $P_0$ which is guaranteed to be less than the required power, and quickly increases transmission power (step 204). Once the received power level at the base station 14 reaches the minimum level needed for detection of the short code (step 206) the base station 14 acquires the correct phase of the short code, transmits an indication of this detection, and begins searching for the access code (step 208). Upon receiving the detection indication, the subscriber unit 16 ceases transmitting the short code and starts transmitting an access code. The subscriber unit 16 initiates a slow ramp-up of transmit power while sending the access code (step 210). The base station 14 searches for the correct phase of the access code by searching only one phase out of each short code length portion of the access code (step 212). If the base station 14 searches the phases of the access code up to the maximum round trip delay and has not detected the correct phase, the search is repeated by searching every phase (step 214). Upon detection of the correct phase of the access code by the base station 14, the base station 14 sends an acknowledgment to the subscriber unit 16 (step 216). Reception of the acknowledgment by the subscriber unit 16 concludes the ramp-up process. A closed loop power control is established, and the subscriber unit 16 continues the call setup process by sending related call setup messages (step 218).

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A method for performing power control in a wireless code division multiple access communication system, the method comprising:
    transmitting dynamically selected code signals at increasing power levels until an acknowledgement is received indicating that one of said dynamically selected code signals was detected, wherein the transmitted dynamically selected code signals carry no data; and in response to detecting the acknowledgment, transmitting an access signal wherein the access signal is associated with the dynamically selected code signals and each of the dynamically selected code signals are shorter than the access signal.

2. A wireless code division multiple access subscriber unit, the subscriber unit comprising:

a transmitter configured such that a first code is transmitted at an initial power level wherein the first code is of a first code type and the transmitter further configured to repeatedly transmit dynamically selected codes of said first code type at increasing power levels wherein the transmitted codes of said first code type carry no data;

a receiver configured such that an acknowledgement is detected indicating a code of said first type was received; and the transmitter configured such that in response to detecting the acknowledgement, a signal having a second code is transmitted to access a communication channel wherein the second code is associated with the first code.

3. A wireless code division multiple access base station, the base station comprising:

a receiver configured such that a code of a first code type is received, the received code carrying no data and being repeatedly transmitted at increasing power levels;

a transmitter configured such that an acknowledgement is transmitted indicating a code of said first type was received; and the receiver configured such that a signal having a second code is received as part of an access procedure wherein the second code is associated with the first code.

4. A method for transmitting a communication in a wireless code division multiple access communication system, the method comprising:

repeatedly transmitting portions of the communication without a remainder of the communication wherein each subsequently transmitted portion is transmitted at an increased power level with respect to a prior transmitted portion, the transmitted portions not including any data;

detecting an acknowledgement indicating one of the transmitted portions was received;

transmitting the remainder of the communication in response to detecting the acknowledgement as part of an access procedure; and wherein each of the portions include a code sequence.

5. A wireless code division multiple access subscriber unit, the subscriber unit comprising:

a transmitter configured such that portions of a communication are transmitted without a remainder of the communication wherein each subsequently transmitted portion is transmitted at an increased power level with respect to a prior transmitted portion, the portions not carrying any data;

a receiver configured such that an acknowledgement is detected indicating the transmitted portion was received; and the transmitter configured such that the remainder of the communication is transmitted in response to detecting the acknowledgement wherein each of the portions include a code sequence.

6. A wireless code division multiple access base station, the base station comprising:

a receiver configured such that a portion of a communication is received without a remainder of the communication, the portion including no data;

a transmitter configured such that an acknowledgement is transmitted indicating the portion was received;

the receiver configured such that a remainder of the communication is received as part of an access procedure; and wherein each of the portions include a code sequence.

7. A method for use in a code division multiple access subscriber unit for establishing communications between said subscriber unit and a base station, said method comprising:

transmitting a plurality of different codes by said subscriber unit to said base station wherein each different code is transmitted at increasing power levels;

receiving an acknowledgement by said subscriber unit from said base station and ceasing transmitting the plurality of different codes, said acknowledgement indicating to said subscriber unit that said base station has received at least one of said different codes; and transmitting, in response to receipt of said acknowledgement, an access signal to facilitate communication initialization between said subscriber unit and said base station, said access signal as transmitted by said subscriber unit and said different codes as transmitted by said subscriber unit each being a function of a same code.

8. The method of claim 7 wherein each different code is sequentially transmitted at increasing power levels.

9. The method of claim 8 wherein the transmitting of the plurality of different codes ceases based on receipt of said acknowledgement.

10. The method of claim 7 wherein the transmitting of the plurality of different codes ceases based on receipt of said acknowledgement.

11. The method of claim 7 wherein said different codes have a bit length less than said access signal.

12. The method of claim 7 wherein said same code comprises a spreading code.

13. The method of claim 12 wherein said different codes as transmitted by said subscriber unit comprise a portion of said spreading code, and wherein said access signal as transmitted by said subscriber unit comprises at least a portion of said spreading code.

14. The method of claim 7 wherein said access signal is transmitted at a power level related to a last power level of said transmitting of said different codes.

15. The method of claim 14 wherein said power level related to said last power level of said transmitting said different codes is an increased power level with respect to said last power level of said transmitting said different codes.

16. The method of claim 7 wherein said transmitting said different codes comprises transmitting a first plurality of different codes derived from a first code before transmitting a second plurality of different codes derived from a second code different than the first code.

17. A method for establishing communications between a subscriber unit and a base station in a code division multiple access communications system, said method comprising:

transmitting less than a complete initialization code sequence from the subscriber unit to the base station at a first power level;

subsequently transmitting less than a complete initialization code sequence at an increased power level;
repeating said subsequently transmitting until an acknowledgement is received by said subscriber unit from said base station; and
transmitting, in response to receipt of said acknowledgement, enough of the initialization code sequence to facilitate communication initialization between said subscriber unit and said base station at a power level related to a last power level of said transmitting of said less than said complete initialization code sequence.

18. The method of claim 17 wherein the less than a complete initialization code sequence is dynamically selected for each subsequent transmission.

19. The method of claim 17 wherein the initialization code sequence includes a spreading code.

20. The method of claim 17 wherein the subsequently transmitted less than a complete initialization code sequence includes different portions of said complete initialization code sequence for at least one of each subsequent transmission.

21. A method for performing an access procedure in a code division multiple access subscriber unit for establishing communications between said subscriber unit and a base station, said method comprising:
transmitting a first code to be used by a base station in establishing communication between said base station and said subscriber unit at a first power level, said first code not providing data of said subscriber unit;
subsequently transmitting, with respect to said first code a same or a different code, at increasing power levels until an acknowledgement is received by the subscriber unit, reception of said acknowledgement by said subscriber unit indicating to said subscriber unit that the base station has detected transmission by the subscriber unit; and
transmitting, in response to receipt of said acknowledgement, a signal by said subscriber unit as part of the access procedure wherein the signal includes a second code that is associated with the same or different code.

22. The method of claim 21 wherein said same or different code is dynamically selected.

23. The method of claim 21 wherein said same or different code has a shorter bit length than the signal transmitted as part of the access procedure.

24. The method of claim 21 wherein said same or different code and said signal transmitted as part of the access procedure are a function of a single code.

25. The method of claim 21 wherein said single code includes a spreading code.

26. A method performed by a code division multiple access subscriber unit for establishing communications between the subscriber unit and a base station, the method comprising:
repeatedly transmitting codes of a first type until the subscriber unit receives an acknowledgement signal from the base station, each transmission of a code of the first type being at an increased power level with respect to a prior transmission of a code of the first type;
upon receiving the acknowledgement signal from the base station, transmitting a code of a second type,
wherein, the acknowledgement signal is an indication to the subscriber unit that the base station has received a code of the first type, and
wherein the subscriber unit sends data to the base station only after the base station has received a code of the first type.

27. The method of claim 26 wherein the code of the first type and the code of the second type are derived from a same code sequence.

28. The method of claim 27 wherein the same code sequence includes a spreading code.

29. The method of claim 26 wherein the code of the first type has a shorter bit length than the code of the second type.

30. A method performed by a code division multiple access subscriber unit for establishing communications between the subscriber unit and a base station, the method comprising:
(a) transmitting a code of a first type, wherein the code of the first type does not include data of the subscriber unit;
(b) determining if the subscriber unit has received an acknowledgement signal from the base station, the acknowledgement signal being an indication to the subscriber unit that the base station has received a code of the first type;
(c) repeating (a) at increasing power levels until the subscriber unit has received the acknowledgement signal; and
(d) transmitting a code of a second type after it is determined that the subscriber unit has received the acknowledgement signal.

31. The method of claim 30 wherein said code of a first type is a dynamically selected code associated with said code of a second type.

32. The method of claim 30 wherein said code of a first type is shorter than said code of a second type.

33. The method of claim 30 wherein said code of a first type carries no data.

34. A method for use in a code division multiple access subscriber unit for establishing communications between said subscriber unit and a base station, said method comprising:
(a) transmitting a first one of a plurality of different codes by said subscriber unit to said base station;
(b) if an acknowledgement is not received, transmitting another one of the plurality of different codes by said subscriber unit to said base station;
(c) repeating step (b) until an acknowledgement is received by said subscriber unit from said base station, said acknowledgement indicating to said subscriber unit that said base station has received at least one of said different codes; and
(d) transmitting, in response to receipt of said acknowledgement, an access signal to facilitate communication initialization between said subscriber unit and said base station, said access signal as transmitted by said subscriber unit and said different codes as transmitted by said subscriber unit each being a function of a same code.

35. The method of claim 34 wherein the transmitting of the plurality of different codes ceases based on receipt of said acknowledgement.

36. The method of claim 34 wherein the same code includes a spreading code.

37. The method of claim 34 wherein each of the plurality of different codes has a bit length less than said access signal.

38. A subscriber unit capable of establishing communications, said subscriber unit comprising:
a code generator for producing a plurality of different codes;

a transmitter for transmitting said produced plurality of different codes, wherein each different code is transmitted at increasing power levels;

a receiver for receiving an acknowledgement, said acknowledgement indicating that at least one of said different codes was received; and wherein said code generator is operable in response to receipt of said acknowledgment by said receiver to produce an access signal and said transmitter transmits said access signal to facilitate communication initialization by said subscriber unit, said access signal and said different codes each being a function of a same code.

39. The subscriber unit of claim 38 wherein the transmitter sequentially transmits each different code at increasing power levels.

40. The subscriber unit of claim 38 wherein said different codes have a bit length less than said access signal.

41. The subscriber unit of claim 38 wherein said same code comprises a spreading code.

42. The subscriber unit of claim 41 wherein said different codes as transmitted by said subscriber unit comprise a portion of said spreading code, and wherein said access signal as transmitted by said subscriber unit comprises at least a portion of said spreading code.

43. The subscriber unit of claim 38 wherein said access signal is transmitted at a power level related to a last power level of said transmitting of said different codes.

44. The subscriber unit of claim 43 wherein said power level related to said last power level of said transmitting said different codes is an increased power level with respect to said last power level of said transmitting said different codes.

45. The subscriber unit of claim 38 wherein said transmitting said different codes comprises transmitting a first plurality of different codes derived from a first code before transmitting a second plurality of different codes derived from a second code different than the first code.

46. A subscriber unit operable to perform an access procedure in a code division multiple access system for establishing communications between said subscriber unit and a base station, said subscriber unit comprising:

a transmitter; and a processor configured to control said transmitter to transmit a first code to be used by a base station in establishing communication between said base station and said subscriber unit at a first power level, said first code not providing data of said subscriber unit, wherein said processor is further configured to control said transmitter to subsequently transmit, with respect to said first code a same or a different code, at increasing power levels until an acknowledgement is received by the subscriber unit, reception of said acknowledgement by said subscriber unit indicating to said subscriber unit that the base station has detected transmission by the subscriber unit, and said processor is further configured to control said transmitter to transmit, in response to receipt of said acknowledgement, a signal by said subscriber unit as part of the access procedure wherein the signal includes a second code that is associated with the same or different code.

47. The subscriber unit of claim 46 wherein the processor is configured such that said same or a different code is dynamically selected.

48. The subscriber unit of claim 46 wherein said same or different code has a shorter bit length than the signal transmitted as part of the access procedure.

49. The subscriber unit of claim 46 wherein said same or different code and said signal transmitted as part of the access procedure are a function of a single code.

50. The subscriber unit of claim 49 wherein said single code includes a spreading code.

51. A subscriber unit operable to perform an access procedure for establishing communications between the subscriber unit and a base station, the subscriber unit comprising:

a transmitter configured to repeatedly transmit codes of a first type wherein each transmission of a code of the first type is transmitted at an increased power level with respect to a prior transmission of a code of the first type;

a receiver configured to receive an acknowledgement from the base station wherein the acknowledgement signal is an indication to the subscriber unit that the base station has received a code of the first type;

the transmitter further configured to transmit a code of a second type to said base station upon receipt by the receiver of said acknowledgement, and wherein the code of a second type includes data.

52. The subscriber unit of claim 51 wherein the transmitter is configured such that the code of the first type and the code of the second type are derived from a same code sequence.

53. The subscriber unit of claim 52 wherein the same code sequence includes a spreading code.

54. The subscriber unit of claim 51 wherein the code of the first type has a shorter bit length than the code of the second type.

55. A subscriber unit operable to perform an access procedure for establishing communications, the subscriber unit comprising:

a transmitter configured to receive a code of a first type and to transmit the received code of the first type, wherein the transmitted code of the first type does not include data of the subscriber unit;

a receiver configured to receive an acknowledgement signal, the acknowledgement signal being an indication to the subscriber unit that a code of the first type was received;

the transmitter further configured to repeatedly receive a code of the first type and to transmit each received code of the first type until the receiver receives the acknowledgement signal; wherein the received transmitted codes of a first type are transmitted at increasing power levels until the receiver has received the acknowledgement signal; and the transmitter, in response to the receiver receiving an acknowledgement, further configured to receive a code of a second type and to transmit the code of the second type.

56. The subscriber unit of claim 55 wherein the transmitter is configured such that said codes of a first type are dynamically selected codes associated with said code of a second type.

57. The subscriber unit of claim 55 wherein each of the received transmitted codes of a first type is shorter than said code of a second type.

58. The subscriber unit of claim 55 wherein said received transmitted codes of a first type carry no data.

59. A subscriber unit for performing an access procedure for establishing communications between said subscriber unit and a base station, said subscriber unit comprising:

a processor configured to control a transmitter such that the transmitter transmits a first one of a plurality of different codes by said subscriber unit to said base station;

a receiver configured to receive an acknowledgement wherein if said acknowledgement is not received, the processor configured to control the transmitter such that the transmitter transmits another one of the plurality of different codes by said subscriber unit to said base station;

the processor configured to control said transmitter such that said transmitter repeats the transmitting of another one of the plurality of different codes until said acknowledgement is received by said subscriber unit from said base station, said acknowledgement indicating to said subscriber unit that said base station has received at least one of said different codes; and said processor configured to control the transmitter such that the transmitter transmits, in response to receipt of said acknowledgement, an access signal to facilitate communication initialization between said subscriber, unit and said base station, said access signal as transmitted by said subscriber unit and said different codes as transmitted by said subscriber unit each being a function of a same code.

60. The subscriber unit of claim 59 wherein the processor is configured to control said transmitter such that the transmitting of the plurality of different codes ceases based on receipt of said acknowledgement.

61. The subscriber unit of claim 59 wherein the same code includes a spreading code.

62. The subscriber unit of claim 59 wherein each of the plurality of different codes has a bit length less than said access signal.

63. A subscriber unit for performing an access procedure for establishing communications between a subscriber unit and a base station in a code division multiple access communications system, said subscriber unit comprising:

a transmitting arrangement configured to control a transmitter such that said transmitter transmits less than a complete initialization code sequence from the subscriber unit to the base station at a first power level;

the transmitting arrangement further configured to subsequently transmit less than a complete initialization code sequence at an increased power level and configured to repeat said subsequent transmitting until an acknowledgement is received by a receiver of said subscriber unit from said base station; and the transmitting arrangement further configured to transmit, in response to receipt of said acknowledgement, enough of the initialization code sequence to facilitate communication initialization between said subscriber unit and said base station at a power level related to a last power level of said transmitting of said less than said complete initialization code sequence.

64. The subscriber unit of claim 63 wherein the transmitting arrangement is configured such that the less than a complete initialization code sequence is dynamically selected for each subsequent transmission.

65. The subscriber unit of claim 63 wherein the initialization code sequence includes a spreading code.

66. The subscriber unit of claim 63 wherein the subsequently transmitted less than a complete initialization code sequence includes different portions of said complete initialization code sequence for at least one of each subsequent transmission.

* * * * *